United States Patent [19]
Ward et al.

[11] 3,745,883
[45] July 17, 1973

[54] SERVO-SYSTEMS
[75] Inventors: Edward J. Ward, Haywards Heath; Rodney Way, Portslade, both of England
[73] Assignee: The Worcester Valve Company Limited, Sussex, England
[22] Filed: July 3, 1972
[21] Appl. No.: 268,267

Related U.S. Application Data
[62] Division of Ser. No. 66,678, Aug. 25, 1970, Pat. No. 3,693,501.

[30] Foreign Application Priority Data
Aug. 28, 1969 Great Britain.................. 42,853/69
June 26, 1970 Great Britain.................. 31,179/70

[52] U.S. Cl................. 91/186, 91/386, 91/387, 91/461, 92/75
[51] Int. Cl.................... F15b 13/16, F01b 7/04
[58] Field of Search................. 91/387, 386, 382, 91/375 R, 461, 186, 75

[56] References Cited
UNITED STATES PATENTS
1,585,170   5/1926   Roucka............................... 91/387
2,129,613   9/1938   Wunsch et al....................... 91/382
2,264,262   11/1941  Erbguth............................. 91/387
2,291,048   7/1942   Lichtenstein....................... 91/387
2,344,768   3/1944   Dodson.............................. 91/382
2,521,557   9/1950   Wyckoff............................. 91/375
3,129,643   4/1964   Porter et al....................... 91/382
3,503,303   3/1970   Domyan.............................. 91/387
3,511,134   5/1970   Wittren............................. 91/387

Primary Examiner—Paul E. Maslousky
Attorney—Allison C. Collard

[57] ABSTRACT

A servo-valve having a range of settings is urged progressively to or from a predetermined setting by a bellows responsive to input-signal fluid pressure. Feedback from the valve output is to a cam having a cam follower linked by a lever of variable velocity ratio to a spring connected to the valve which biasses the valve towards one end of its range of settings. The relationship between input-signal fluid pressure and valve output is determined by the contour of the cam surface and the relationship between change in input-signal fluid pressure and corresponding change in valve output is determined by the velocity ratio of the lever.

19 Claims, 4 Drawing Figures

United States Patent [19]
Ward et al.
[11] 3,745,883
[45] July 17, 1973
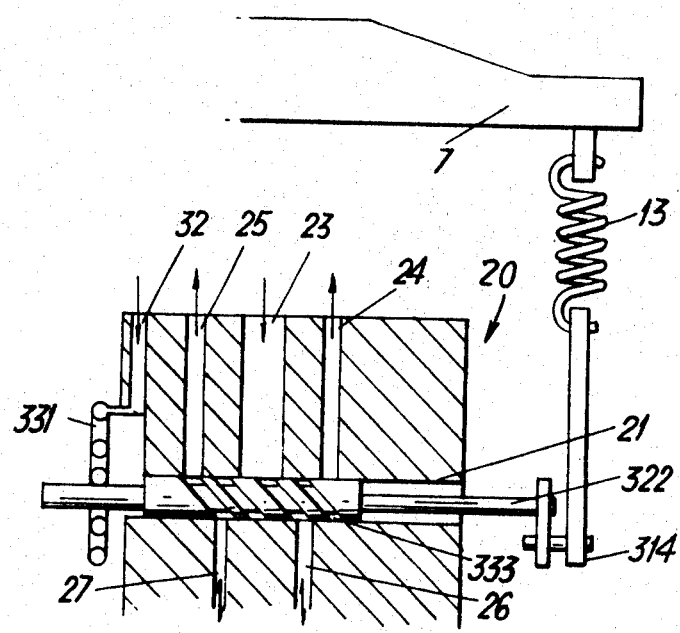

SERVO-SYSTEMS

This is a division of application Ser. No. 66,678 filed on Aug. 25, 1970, now U.S. Pat. No. 3,693,501.

The invention relates to servo-systems of the type in which the setting of a quarter-turn actuator, e.g., for a throttling ball-valve, is controlled by a pneumatic or hydraulic feed-back system incorporating a servo-valve.

In systems of this type, it is often required that the degree of amplification by the system of the input signal should be variable so that the whole range of input signals should be matched by the whole range of valve output and so that different ranges of input signals can be accommodated by the valve. It is also often required that the relationship between the input signal and the valve output be alterable e.g., the relationship may have to be for linear flow, or for equal percentage flow or for linear opening.

It is therefore an object of the present invention to provide a control system in which the degree of amplification may be varied and/or in which the relationship between the input signal and valve output may be varied.

It is another object of the present invention to provide a fluid-operated servo-system for the control of the setting of a progressively-acting servo-valve having a range of settings, the system comprising signal-fluid input means; first means connected to the signal fluid input means and responsive to the pressure of signal fluid within the input means, said first means being connected to the servo-valve and acting to urge the servo-valve progressively to or from a predetermined setting with a force dependent upon the pressure at the input means; spring means connected to said servo-valve so as to bias the servo-valve towards one end of the range of settings of the servo-valve thereby to pre-set the force required by the first means to set said servo-valve at the pre-determined setting; cam means having a cam surface; connecting means connecting the cam means to said servo-valve so that change of servo-valve output causes movement of the cam means; cam-follower means riding on the cam surface; lever means connecting the cam-follower means to the spring means so as to vary the biassing force of the spring means with change of position of the cam-follower means; and adjustment means for varying the velocity ratio of the lever means, the arrangement being such that, in operation, the relationship between input-signal fluid pressure and servo-valve output fluid pressure is determined by the contour of the cam surface and the relationship between change in input-signal fluid pressure and corresponding change in servo-valve output fluid pressure is determined by the velocity ratio of the lever means.

It is a further object of the present invention to provide such a system for the control of a servo-valve of the sliding-spool type, wherein the first means comprises a bellows.

It is a further object to provide such a system in which said spring means is attached at one end to the servo-valve and at the opposite send to the lever means.

It is a further object to provide a system wherein spring means is incorporated into bellows by way of bellows having walls sufficiently resilient to constitute spring means and wherein bellows are attached at one end to servo-valve and at the opposite end to lever system.

It is a further object to provide a system for the control of a servo-valve of the rotary spool type, wherein the first means comprises a bourdon tube.

It is a further object to provide such a system wherein the spring means is attached to said servo-valve by way of a bell crank.

It is also an object of the present invention to provide a fluid-operated servo-system for the control of the setting of a progressively-acting servo-valve having a range of settings, the system comprising signal fluid input means; bellows means leading from the signal-fluid input means and connected to the servo-valve so as to be able to change the setting of the servo-valve in response to change in pressure within the signal-fluid input means and thereby urge said servo-valve to or away from a predetermined setting within the range of settings; biassing means attached to said servo-valve so as to bias the servo-valve towards one end of said range of settings and thereby pre-set the force required by the bellows to set said servo-valve at said predetermined setting; and means for varying the biassing force of the biassing means in response to change in servo-valve output; the means for varying the biassing force comprising cam means having a cam surface and moveable in response to change in servo-valve output, connecting means linking the servo-valve to the cam means so as to move said cam means when output of the servo-valve changes, cam-follower means which rides on the cam surface, lever means connecting said cam-follower to the biassing means so as to vary the biassing force of the biassing means when said cam follower means moves, and means for varying the velocity ratio of the lever means.

It is a further object to provide such systems in which the cam means has a plurality of cam surfaces, the cam means being settable so that the cam follower means can ride on any one cam surface, each cam surface being contoured to correspond to a unique servo-valve input/output relationship.

It is a further object to provide such systems in which the connecting means comprises actuator means comprising a transducer means for converting change in fluid pressure into movement of the actuator means, the actuator means being linked to the cam means and being arranged to be fed from fluid output from the servo-valve, so that, in operation, an indication of change of servo-valve fluid output is fed back to the servo-valve by way of movement of the actuator means, consequent movement of the cam means and cam-follower means and consequent variation in biassing force of the biassing means, thereby to vary the force required by the bellows means to set said servo-valve at said predetermined setting.

It is a further object to provide such systems further comprising relay means interposed between the servo-valve and said actuator means.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

Referring to the drawings, wherein similar reference characters denote similar illustrations throughout the several views.

Figure 1:
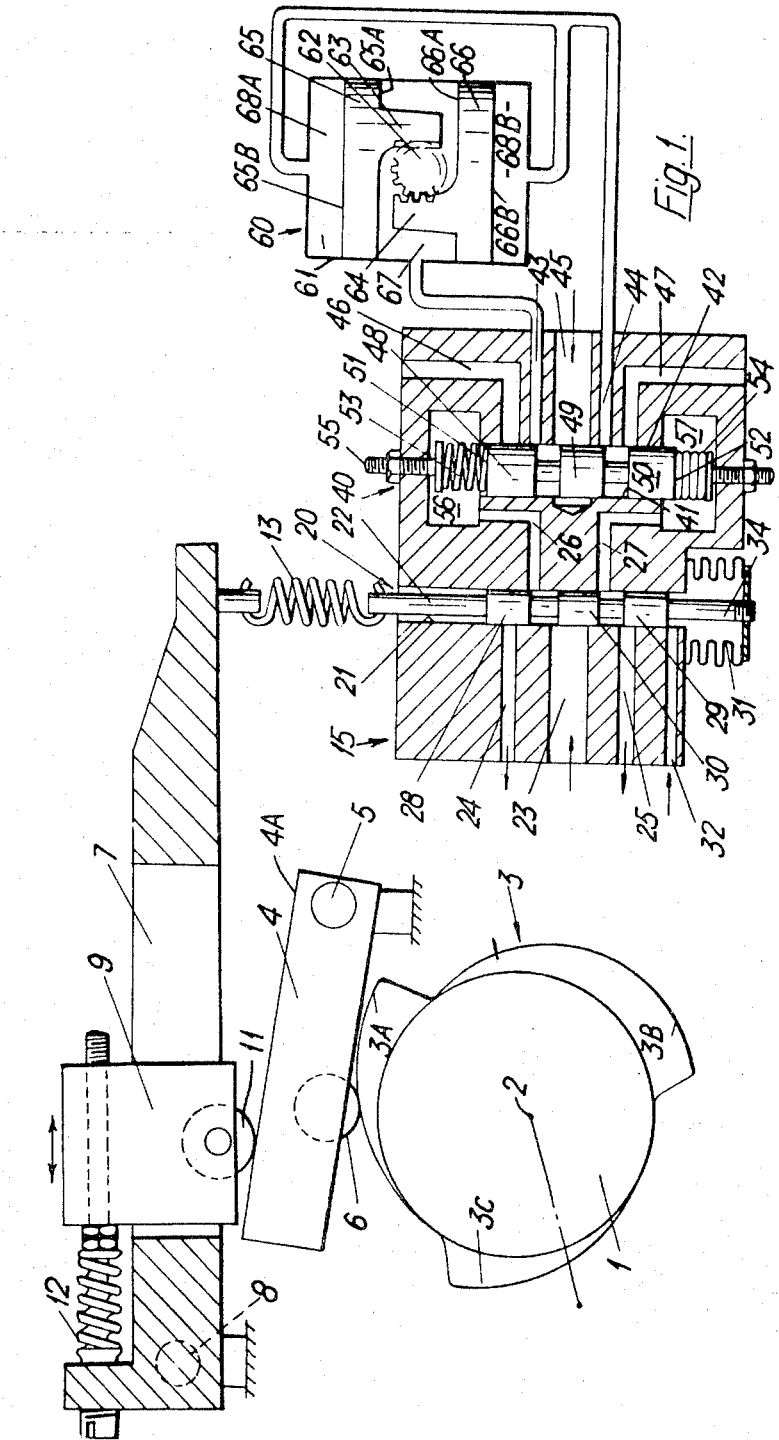
FIG. 1 is a diagram of a generalised arrangement.

Referring to the drawings, specifically FIG. 1, there is shown a servo-valve assembly 15, herein referred to as a "servo-valve", which includes a pilot valve stage 20, a main valve stage 40, and an actuator 60. A cam 1 is mounted to rotate about an axis 2 and has a profile 3 comprising three cam surfaces 3A, 3B and 3C. A first arm 4 is mounted to pivot about an axis 5 and has a bearing 6 which engages the cam 1 at a constant distance from the axis 5. A second arm 7 is mounted to pivot about an axis 8 which is a fixed distance from axis 5, and the second arm 7 carries a slide member 9 on which is mounted a bearing 11 which engages a surface 4A on first arm 4. The position of slide-member 9 is adjustable on second arm 7 by means of a control screw 12, so that the distance of bearing 11 from axis 8 can be altered. The free end of second arm 7 is connected by way of a spring 13, to valve assembly 15.

The valve assembly 15 comprises pilot valve stage 20 actuating a main valve stage 40 which operates the actuator 60 of a modulator ball valve assembly (not shown). Slidably guided within cylinder 21 of the pilot valve stage 20 is pilot stage spool 22. The cylinder 21 has a main air supply inlet 23 between two exhaust outlets 24, 25 on one side and two air signal outlet ducts 26, 27 on the other side. The cylinder is sealed at either end by lands 28 and 29 and a central land 30 is positioned either to connect the main air inlet 23 with air signal outlet 26 and air signal outlet 27 with exhaust outlet 25 or to connect the main air inlet 23 with air signal outlet 24 and air signal outlet 26 with exhaust outlet 24, depending upon the position of the spool 22 within the cylinder 21. The spool 22 is connected at one end to the spring linkage 13 and at the other end to a bellows 31. The interior of the bellows 31 has an air signal connection 32. The bellows 31 is arranged so that air from the air signal inlet 32 can inflate the bellows 31 thereby pulling the spool 22 through the cylinder 21 against the force of the spring linkage 13.

Slidably guided within cylinder 41 of main valve stage 40 is a main stage spool 42. Leading from the cylinder 41 are main air ducts 43 and 44 each of which, at their valve ends, connect either with main air inlet 45 or with exhaust outlets 46 and 47 respectively depending upon the position of lands 48, 49 and 50 of the spool 42. At either end of the spool 42 are piston surfaces 51, 52 which face chambers 56, 57 respectively. Leading into chamber 56, 57 are the two air signal outlet ducts 26 and 27 respectively from the pilot stage 20. Acting between the outer chamber walls and the surfaces 51, 52 are two springs 53 and 54 respectively which act in directions opposite each other and urge the spool 42 into a central, null position. Fine adjustment of the null position may be made by use of the adjustable end stop 55.

Main air ducts 43, 44 lead from the main valve 40 to the actuator stage 60. The actuator comprises a cylinder 61 having a centrally positioned pinion gear 62 attached to the ball valve spindle of a ball valve (not shown). Engaged with the gear 62 at opposite sides are two racks 63, 64 each of which is attached to a piston 65, 66 respectively. Each piston 65, 66 has an inner piston surface 65A which together define, within the cylinder 61 an inner chamber 67, and each also has an outer piston surface 65A, 65B which, define, within the cylinder 61 outer chambers 68A and 68B respectively. Main air duct 43 leads from the main valve stage 40 into chamber 67 and main air duct 44 leads from the main valve stage 40, bifurcates and leads to both outer chambers 68A/B.

The valve assembly 15 and actuator 60 operate as follows. When the force on spool 22 from the pressure of air in bellows 31 counterbalances the force from the spring linkage 13, the spool 22 takes up a predetermined setting, in this case a central, null position wherein lands 88, 29 and 30 seal off inlet 23 and outlets 24 and 25 from ducts 26 and 27. When the force on the spool 22 from the pressure of air in bellows 31 exceeds the force from the spring linkage 13, the spool 22 moves downwards (as seen in the drawing) due to the expansion of the bellows 31. In the lower position of the spool 22, main air inlet 23 communicates with duct 26 so that main air pressure acts on piston surface 51 forcing the spool 42 downwards against spring 54 so that air is vented from chamber 57 via duct 27 and outlet 25. In the lower position of spool 42 main air inlet 45 communicates with air duct 43 so that the main air pressure acts on piston surfaces 65A, 66A forcing the pistons 65 and 66 apart and venting air from chambers 68A/B via duct 44 and outlet 47. Movement apart of the pistons 65 and 66 causes the racks 63 and 64 to rotate the piston gear 62 anti-clockwise.

Similarly, when the force on the spool 22 from the pressure of air in bellows 31 is less than the force from the spring linkage 13, the spool 22 moves upwards due to the contraction of the bellows 31. In the upper position of the spool 22, main air inlet 23 communicates with duct 27 so that main air pressure acts on piston surface 52 forcing the spool 42 upwards against spring 53 so that air is vented from chamber 56 via duct 26 and outlet 24. In the upper position of spool 42, main air inlet 45 communicates with air duct 44 so that the main air pressure acts on piston surfaces 65B, 66B forcing together pistons 65 and 66 and venting air from chamber 67 via duct 43 and outlet 46. Movement of the pistons 65 and 66 causes the racks 63 and 64 to rotate the pinion gear 62 clockwise.

The piston gear 62 and cam 1 are attached to the same mainshaft as the ball valve spindle, so rotation of gear 62 and hence of the ball valve spindle, causes similar rotation of the cam 1. Thus, in operation, "high" pressure at air signal inlet 32 causes pilot stage spool 22 to lower, which causes main stage spool 42 to rise, which causes pistons 65, 66 to rotate the pinion gear 62 anti-clockwise. Anti-clockwise rotation of pin gear 62 causes the cam 1 also to rotate anti-clockwise so that cam follower bearing 6 is pushed upwards by cam surface 3A thereby causing the second arm 7 to rotate anti-clockwise about axis 8. This rotation of the second arm 7 increases the tension on spring linkage 13 so that the spool 22 moves upwards decreasing the air passing through main air inlet 23 and hence rotation of pinion gear 62 until the forces on opposite ends of the spool 22 bellows and it returns to its null position. Hence "high" pressure at inlet 32 tends to oppose in the spring linkage 13 thereby tending to return the spool 22 to its null position. Similarly " low" pressure at inlet 32 tends to produce a decrease in tension in the spring linkage 13 resulting in return of the spool 22 towards its null position.

The relationship between rotation of the cam 1 and consequent change of position of the pilot spool 22 is governed by the shape of one of the cam surfaces 3A, B and C, and also by the amplification of the movement of the bearing 6 by the lever system comprising the two arms 4 and 7 through the slide member 9 to the spring linkage 13.

Each cam surface profile is contoured to express a particular relationship between the (input) signal pressure inlet 32 and the (output) pinion gear 62 rotation and there are usually (a) equal percentage flow, (b) linear flow or (c) linear opening. Also the amplification of the cam system is adjusted so that the total range of signal pressures corresponds to the total range of ball valve operation and this adjustment may be made without upsetting the null position of the pilot stage spool 22. Null adjustment 34 at the bellows end of the spool 22 is used to set the pilot stage spool 22 at null and adjustment stop 55 is used to obtain symmetrical response of the main stage spool 42.

Figure 2:
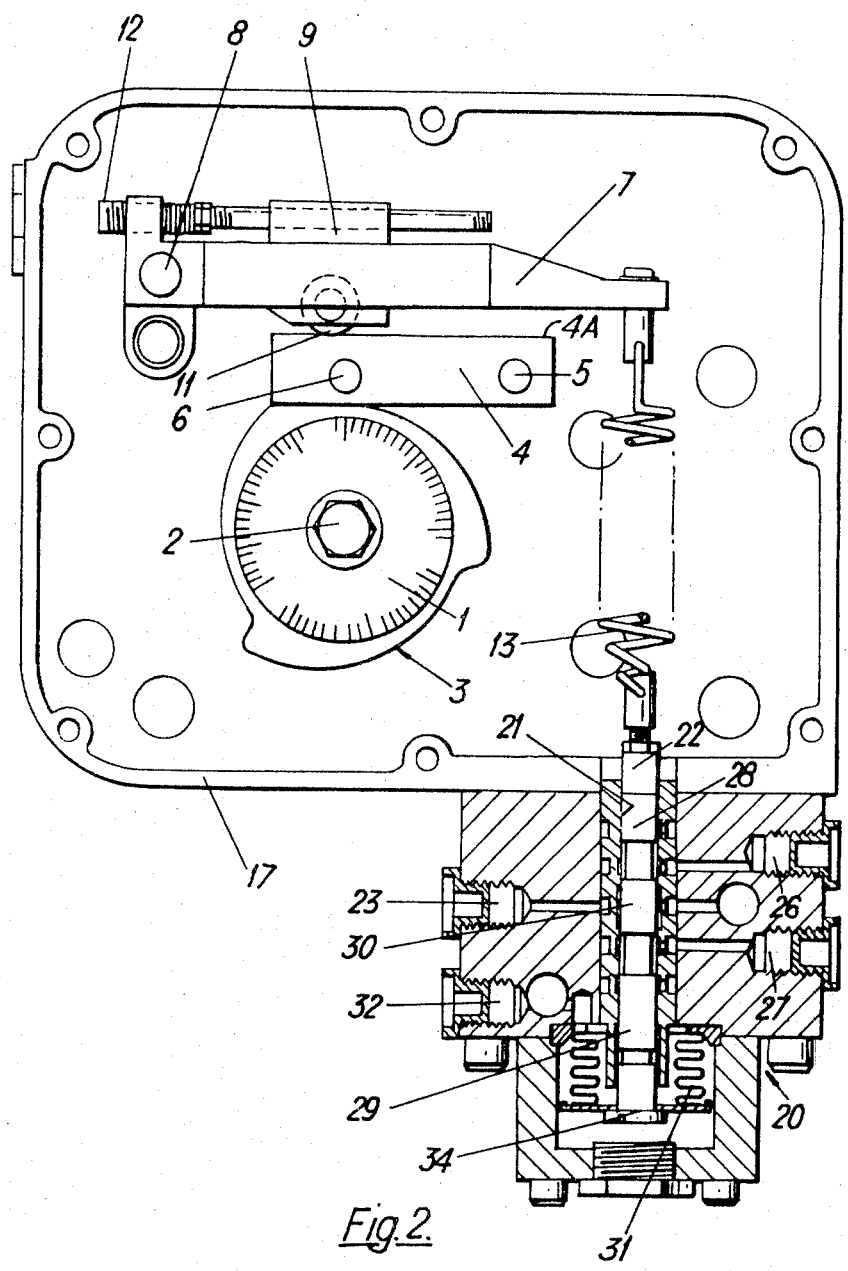
FIG. 2 is a view partly in section through a practical embodiment of part of the arrangement shown in FIG. 1.

FIG. 2 shows the cam system within a positioner case 17 incorporated as a single unit within the pilot stage 20. Other parts have been labelled as the corresponding parts in FIG. 1. It can be seen that both range and null adjustments can be made externally of the positioner case 17.

Figure 3:
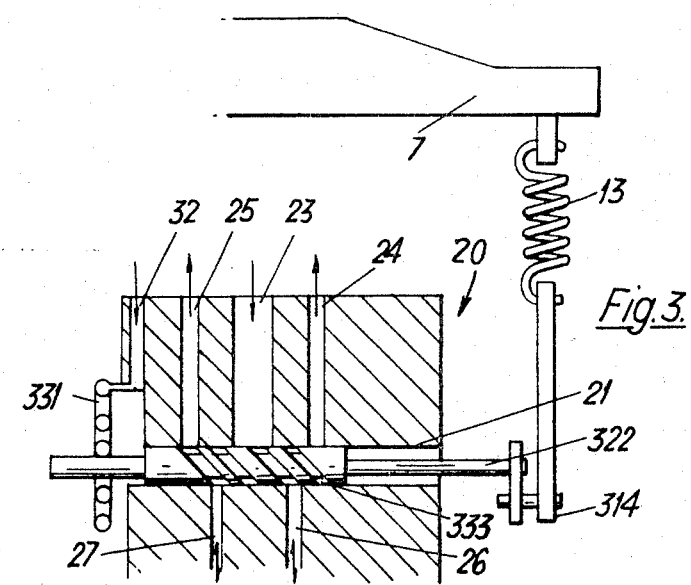
FIG. 3 is a diagram of a second possible arrangement.

FIG. 3 shows a second arrangement for actuating the pilot stage 20. In this case, the pilot stage 20 comprises a cylinder 21 and a pilot stage spool 322 having angled grooves 333 which are positioned so that the stage 20 is operated by rotation of the spool 322.

Thus, in one position, the main air supply inlet 23 will communicate with the air signal outlet duct 26 and the air signal outlet duct 27 will communicate with the exhaust outlet 25, and in the opposite position the main air supply inlet 23 will communicate with duct 27 and duct 26 will communicate with outlet 24.

The spool 322 can be rotated by a Bourdon tube 331 at one end of the spool and by a bell crank 314 at the other end of the spool, the bell crank 314 being connected to the second arm 7 via the spring linkage 13.

Thus, as in the arrangement of FIGS. 1 and 2, air under pressure, from the air signal inlet 32, tends to move the spool 322 against the force from the spring 13 being in this case, transmitted via the bell crank 314.

Figure 4:
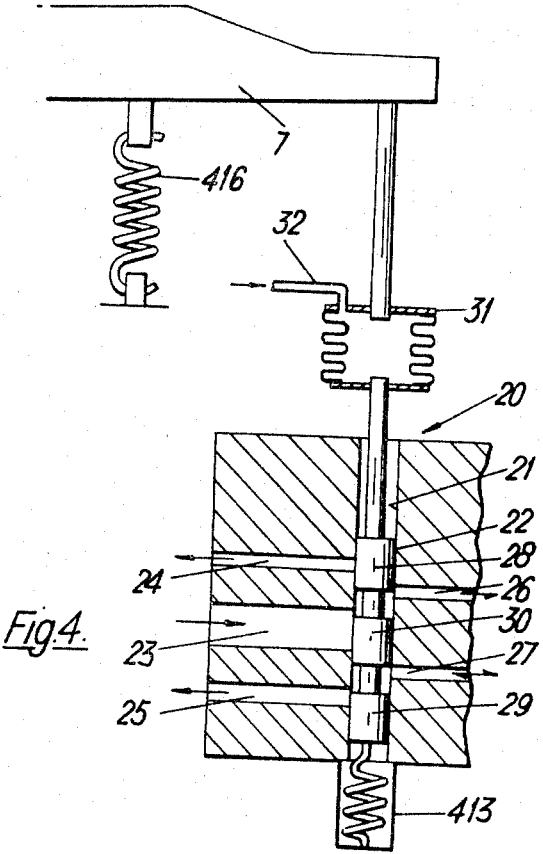
FIG. 4 is a diagram of a third possible arrangement.

FIG. 4 shows a third arrangement for actuating the pilot stage 20. In this case, the pilot stage arrangement is the same as that described with reference to FIGS. 1 and 2; however the bellows 31 is positioned to "float" between the second arm 7 and the pilot stage spool 22 and the bearings 6 and 11 are kept on their respective surfaces 3 and 4A (see FIGS. 1 and 2) by means of a tension spring 416. In this arrangement, the inherent resilience of the bellows 31 may be sufficient to the equivalent to that of spring linkage 13, however, by incorporating a spring box 413 at the end of spool 22 opposite to the bellows 31, this arrangement may be used for split range operation.

As an extreme variation, it may be possible for the cam to directly operate a bleed valve thereby limiting directly the pressure inside the bellows.

Of course, the invention may be applied to other forms of quarter-term actuaters, e.g., butterfly valves.

We claim:

1. A fluid operated servo-system for the control of the setting of a progressively acting servo-valve assembly, including a pilot valve, a main valve movable to produce a fluid output pressure, and an actuator having a range of settings, comprising:
    fluid signal input means;
    a Bourdon tube, coupled to one end of the pilot valve, and coupled and responsive to said fluid signal input means, for rotatably displacing the pilot valve to or from a predetermined position with a force dependent upon the pressure within said fluid signal input means;
    a movable cam, having at least one eccentric cam surface, responsive to the output of the actuator;
    means for coupling said cam to the actuator, so that changes in the output of the actuator cause movement of said cam;
    a cam follower, for engaging said eccentric cam surface, responsive to movement of said cam;
    a lever, pivotably mounted at one end, and coupled at the other end to the pilot valve, for engaging said cam follower and responsive to movement thereof;
    a bell crank, coupled to the other end of the pilot valve;
    spring means, coupled at one end to said lever and at the other end to said bell crank, for rotatably biasing the pilot valve in a predetermined direction, said lever varying the biasing force of said spring means over a predetermined range of values in response to movement of said cam and said cam follower caused by change in the actuator output; and
    adjustment means, for varying the velocity ratio of said lever and thereby changing said predetermined range of said biasing force values, the relationship between the fluid signal input pressure and the main valve fluid output pressure being determined by the contour of said eccentric cam surface, and the relationship between the change in the fluid signal input pressure and the corresponding change in the main valve fluid output pressure being determined by the velocity ratio of said lever.

2. The servo-system as recited in claim 1, wherein said cam is provided with a plurality of eccentric cam surfaces, each contoured so as to correspond to a unique servo-valve assembly input-output relationship, and wherein said cam follower is adjustable so that each of said plurality of cam surfaces is engaged by said cam follower.

3. The servo-system as recited in claim 2, wherein said cam follower comprises a lever arm, pivotably mounted at one end, and having a bearing rotatably mounted therein for engaging said eccentric cam surfaces.

4. The servo-system as recited in claim 3, wherein said lever further comprises a slide member, slidably mounted on said lever, and a bearing, rotatably mounted on said slide member for engaging said cam follower and pivoting said lever in response to movement of said cam follower.

5. The servo-system as recited in claim 4, wherein said adjustment means comprises a threaded bolt, rotatably mounted on said lever at one end and threadably engaged through said slide member at the other end, for adjusting the position of said slide member on said lever.

6. The servo-system as recited in claim 3, wherein said actuator comprises a cylinder, a pair of pistons slidably disposed in opposite directions within said cylinder, said cylinder being coupled to the pilot and main valves of the servo-system assembly so that said pistons are responsive in two directions to fluid pressure output from the main valve, said cam rotating in response to movement of said pistons within said cylinder, thereby adjusting the biasing force of said spring means and the force required to be exerted by said bellows to displace the pilot valve.

7. The servo-system as recited in claim 6, wherein said means for coupling said cam to the actuator comprises a rack and pinion gear system for translating linear movement of said pistons into rotational movement of said cam.

8. The servo-system as recited in claim 3, wherein said spring means is a coil spring.

9. The servo-system as recited in claim 3, wherein said fluid signal input means comprises an air inlet passage.

10. A fluid-operated servo-system for the control of the setting of a progressively acting servo-valve assembly, including a pilot valve, a main valve movable to produce a fluid output pressure, and an actuator having a range of settings, comprising:
   fluid signal input means;
   resilient bellows, coupled at one end to one end of the pilot valve, and having an air chamber thereof coupled to said fluid signal input means so that said bellows are responsive to pressure within said fluid signal input means and progressively displace the pilot valve to or from a predetermined position with a force dependent upon the pressure within said fluid signal input means;
   a movable cam, having at least one eccentric cam surface, responsive to the output of the actuator;
   means for coupling said cam to the actuator, so that changes in the output of the actuator cause movement of said cam;
   a cam follower, for engaging said eccentric cam surface, responsive to movement of said cam;
   a lever, pivotably mounted at one end, and coupled at its other end to the other end of said bellows, for engaging said cam follower and responsive to movement thereof, said lever varying the biasing force of said bellows over a predetermined range of values in response to movement of said cam and said cam follower caused by change in the actuator output;
   first spring means, coupled at one end to said lever and fixed at the other end with respect thereto, for biasing the lever in a predetermined direction; and
   adjustment means, for varying the velocity ratio of said lever and thereby changing said predetermined range of biasing force values created by said bellows, the relationship between the fluid signal input pressure and the main valve fluid output pressure being determined by the contour of said eccentric cam surface, and the relationship between the change of said fluid signal input pressure and the corresponding change in the main valve fluid output pressure being determined by the velocity ratio of said lever.

11. The servo-system as recited in claim 10, further comprising second spring means, coupled at one end to the other end of the pilot valve, and fixed at the other end with respect thereto, for biasing, in conjunction with said bellows, the pilot valve in a predetermined direction, said lever varying the biasing force of said second spring means and said bellows over a predetermined range of values in response to movement of said cam and said cam follower caused by change in the actuator output.

12. The servo-system as recited in claim 11, wherein said cam is provided with a plurality of eccentric cam surfaces, each contoured so as to correspond to a unique servo-valve assembly input-ouput relationship, and wherein said cam follower is adjustable so that each of said plurality of cam surfaces is engaged by said cam follower.

13. The servo-system as recited in claim 12, wherein said cam follower comprises a lever arm, pivotably mounted at one end, having a bearing rotatably mounted therein for engaging said eccentric cam surfaces.

14. The servo-system as recited in claim 13, wherein said lever further comprises a slide member, slidably mounted on said lever, and a bearing rotatably mounted on said slide member, for engaging said cam follower and pivoting said lever in response to movement of said cam follower.

15. The servo-system as recited in claim 14, wherein said adjustment means comprises a threaded bolt, rotatably mounted on said lever at one end and threadably engaged through said slide member at the other end, for adjusting the position of said slide member on said lever.

16. The servo-system as recited in claim 13, wherein said actuator comprises a cylinder, a pair of pistons slidably disposed in opposite directions within said cylinder, said cylinder being coupled to the pilot and main valves of the servo-system assembly so that said pistons are responsive in two directions to fluid pressure output from the main valve, said cam rotating in response to movement of said pistons within said cylinders, thereby adjusting the biasing force of said second spring means and said bellows, and the force required to be exerted by said bellows to displace the pilot valve.

17. The servo-system as recited in claim 16, wherein said means for coupling said cam to the actuator comprises a rack and pinion gear system for translating linear movement of said pistons into rotational movement of said cam.

18. The servo-system as recited in claim 13, wherein said first and second spring means are coil springs.

19. The servo-system as recited in claim 13, wherein said fluid signal input means comprises an air inlet passage.

* * * * *